United States Patent [19]

Ness

[11] Patent Number: 5,662,193
[45] Date of Patent: Sep. 2, 1997

[54] HOUSING FOR A RETRACTACLE CORD MECHANISM

[75] Inventor: Randolph Peter Ness, Ryley, Canada

[73] Assignee: Reel-Thing Innovations, Inc., The, Sherwood Park, Canada

[21] Appl. No.: 574,385

[22] Filed: Dec. 18, 1995

[51] Int. Cl.⁶ .................................................. H02G 11/02
[52] U.S. Cl. ............................. 191/12.2 R; 191/12.4
[58] Field of Search ...................... 191/12 R, 12.2 R, 191/12.4, 12.2 A; 439/4; 242/398, 406

[56] References Cited

U.S. PATENT DOCUMENTS

| 447,889 | 3/1891 | Matteson | 191/12.2 R |
|---|---|---|---|
| 1,139,554 | 5/1915 | MacLean | 191/12.2 R |
| 1,288,511 | 12/1918 | Clarke | 191/12.2 R |
| 1,626,376 | 4/1927 | Anderson | 191/12.2 R |
| 2,745,912 | 5/1956 | Meyer | 191/12.2 R |
| 3,296,387 | 1/1967 | Baigue | 191/12.4 |
| 4,095,871 | 6/1978 | Holte | 191/12.4 X |
| 4,656,320 | 4/1987 | Maddock | 191/12.4 |
| 4,946,010 | 8/1990 | Di Bono | 191/12.2 R |
| 5,129,828 | 7/1992 | Bass | 191/12.2 R X |

FOREIGN PATENT DOCUMENTS 881145  11/1961  United Kingdom .................. 191/12.4

Primary Examiner—James W. Keenan
Assistant Examiner—Scott L. Lowe
Attorney, Agent, or Firm—Anthony G. Lambert

[57] ABSTRACT

A housing for a retractable cord mechanism includes a first body, a second body and a coupling for securing the first body to the second body in a water tight manner to create a composite body with an interior cavity. The composite body has a snout-like projection with an opening positioned at a terminus of the snout-like projection. The composite body is mounted with the snout-like projection angled downwardly such that any water splashed up into the interior cavity of the composite housing drains by force of gravity out of the opening at the terminus of the snout-like projection.

6 Claims, 5 Drawing Sheets

5,662,193

HOUSING FOR A RETRACTACLE CORD MECHANISM

FIELD OF THE INVENTION

The present invention relates to a housing for a retractable cord mechanism and, in particular, one intended to be mounted on a motor vehicle.

BACKGROUND OF THE INVENTION

The utility of retracting mechanisms for extension cords has long been recognized. As a consequence, they are being used for an infinite variety of applications. The use of such mechanisms in outdoor applications has been limited by the lack of an adequate housing. The function of the housing is to prevent water from getting into the retracting mechanism and shorting out electrical connections. In order to be effective for outdoor use, a housing must as a minimum requirement be able to be subjected to continuous drenching by rain and still keep the retracting mechanism and electrical connections dry. When a housing is mounted onto a motor vehicle, a further problem encountered is that water on the road splashes up and into the housing.

SUMMARY OF THE INVENTION

What is required is a housing for a retractable cord mechanism that is better suited for mounting on a motor vehicle.

According to the present invention there is provided a housing for a retractable cord mechanism which includes a first body, a second body and means for securing the first body to the second body in a water tight manner to create a composite body with an interior cavity. The composite body has a snout-like projection with an opening positioned at a terminus of the snout-like projection. Means is provided for mounting the composite body with the snout-like projection angled downwardly such that any water splashed up into the interior cavity of the composite housing drains by force of gravity out of the opening at the terminus of the snout-like projection.

With the housing, as described above, water splashing into the interior cavity of the housing is no longer a problem, as the snout-like projection provides a suitable means for allowing such water to drain.

Although beneficial results may be obtained through the use of the housing, as described above, another problem commonly encountered is that of heat build up due to excessive electrical current flow. Even more beneficial results may, therefore, be obtained when the composite body includes a secondary water resistant compartment in which a circuit breaker is disposed. The circuit breaker is coupled to wiring of a cord positioned on a retracting mechanism.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
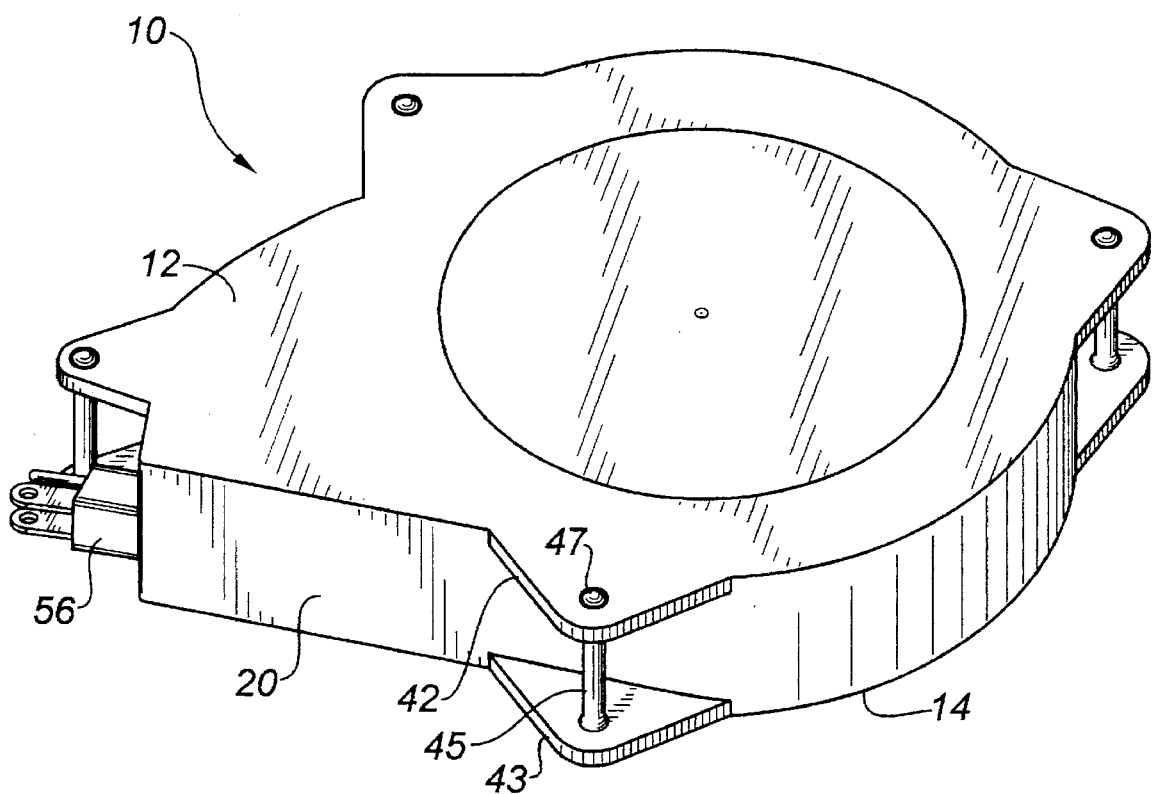
FIG. 1 is a perspective view of a housing constructed in accordance with the teachings of the present invention.

The preferred embodiment, a housing for a retractable cord mechanism generally identified by reference numeral 10, will now be described with reference to FIGS. 1 through 5.

Figure 2:
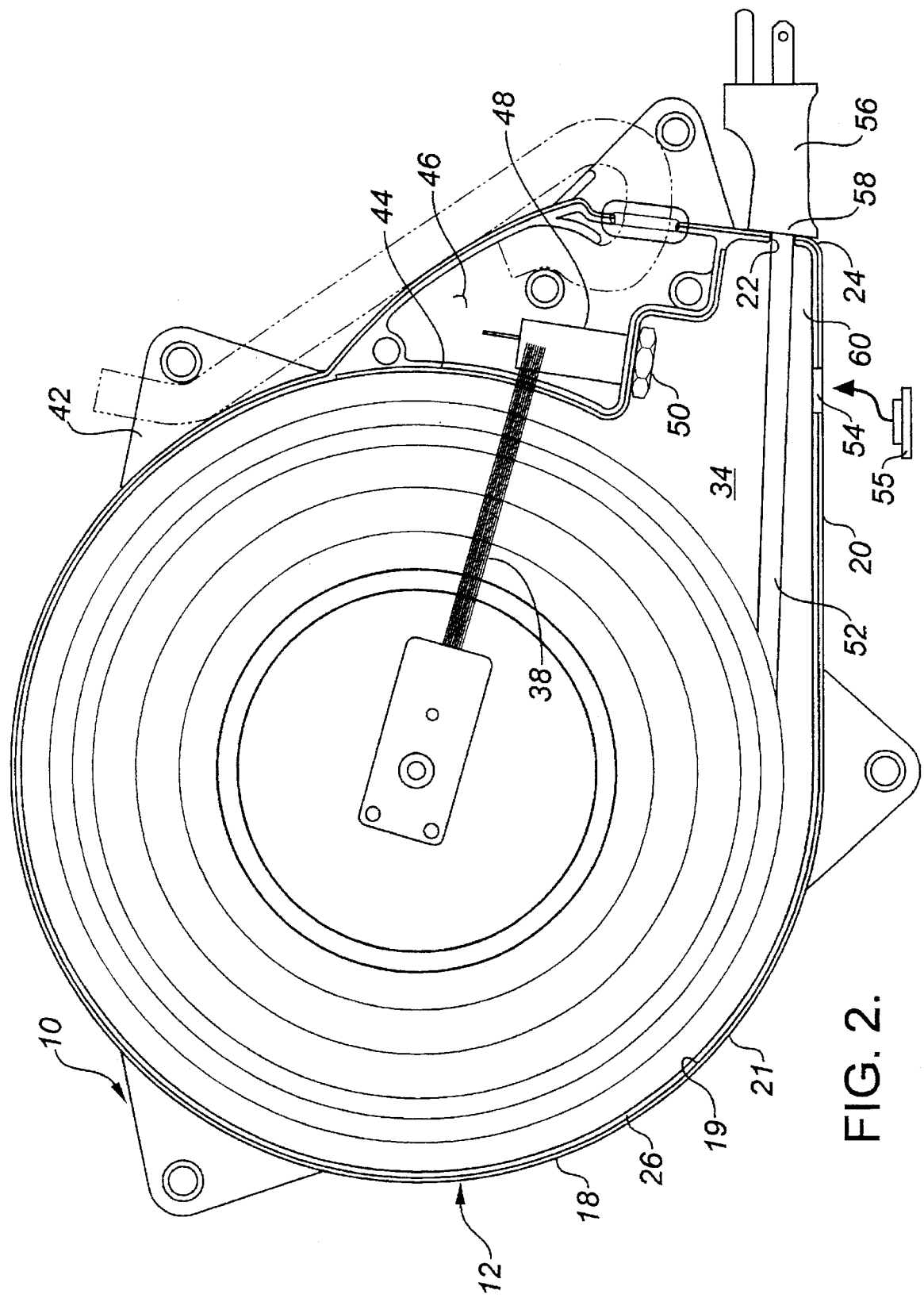
FIG. 2 is a side elevation view in section of the housing illustrated in FIG. 1.
Figure 3:
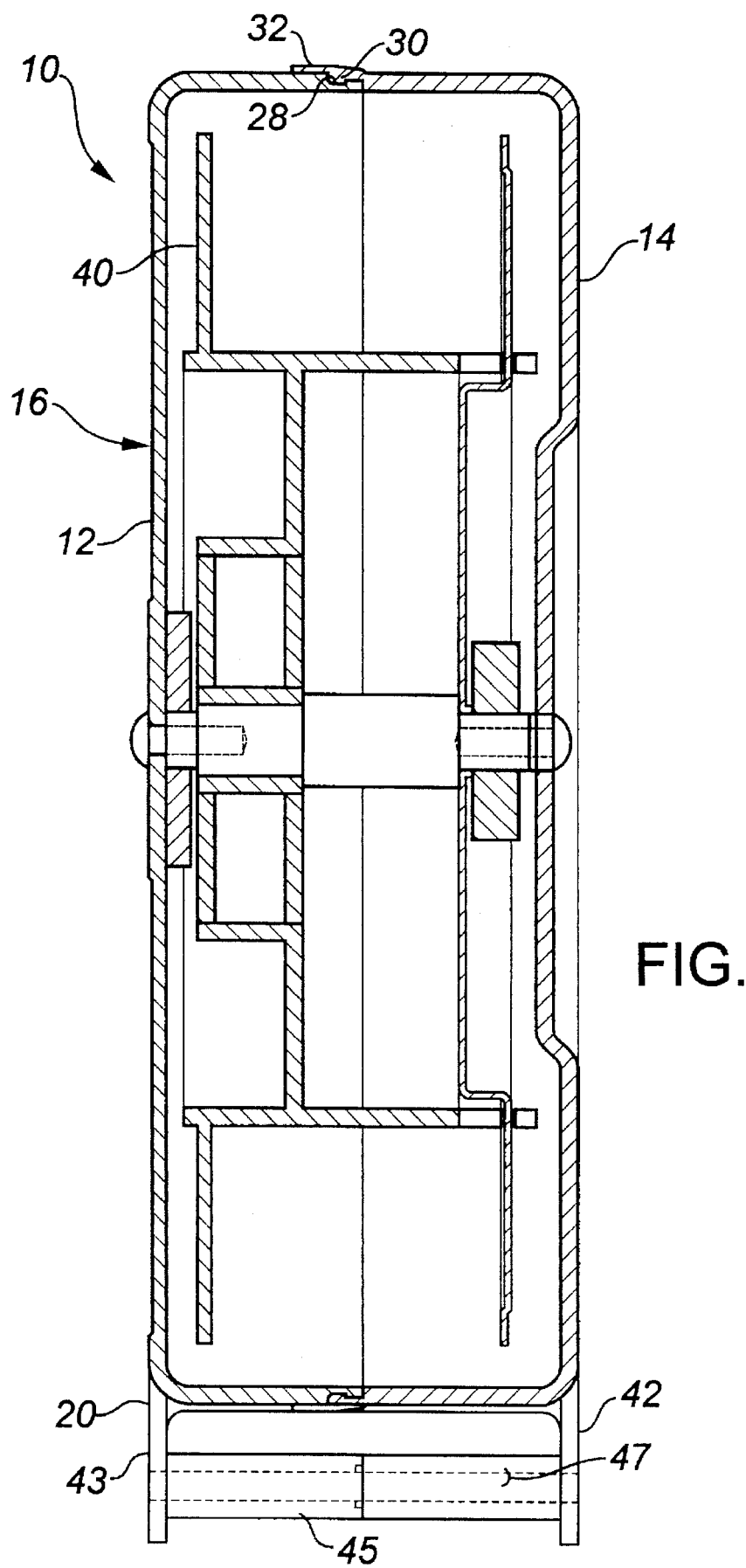
FIG. 3 is an end elevation view in section of the housing illustrated in FIG. 1.

Referring to FIG. 3, housing 10 includes a first shell form body 12 and a second shell form body 14 which are joined together to form a composite body, generally indicated by reference numeral 16. Body 12 and body 14 are mirror images of each other. Referring to FIG. 2, body 12 is illustrated. It will be appreciated that body 14 is similar in construction. Body 12 has a form defining sidewall 18 that includes a snout-like projection 20. Sidewall 18 has an interior surface 19 and an exterior surface 21. An opening 22 extends through sidewall 18 at a terminus 24 of snout-like projection 20. Sidewall 18 has a top peripheral edge 26. Referring to FIG. 3, sidewall 18 of first body 12 adjacent top peripheral edge 26 is secured to sidewall 18 of second body 14 adjacent top peripheral edge 26. The preferred means of securing first body 12 to second body 14 in a water tight manner involves abutting top peripheral edge 26 of sidewall 18 of first body 12 with top peripheral edge 26 of sidewall 18 of second body 14. A female coupling 28 is positioned in exterior surface 21 of sidewall 18 of second body 14 adjacent top peripheral edge 26. A male coupling 30 is provided on interior surface 19 of sidewall 18 of first body 12. Male coupling 30 is positioned on a flange portion 32. Flange portion 32 of second body 14 overlies first body 12 enabling male coupling 30 to mate with female coupling 28 to provide a water resistant seal. First body 12 is mated with second body 14, as described, to form composite body 16. Referring to FIG. 3, composite body 16 has an interior cavity 34 in which a cord retracting mechanism, generally indicated by reference numeral 36 is positioned, together with associated electrical wiring and electrical connections 38, as illustrated in FIG. 2. Cord retracting mechanism 36 includes a rotatably mounted spool 40. Spool 40 is biased by a biasing spring (not shown). A plurality of pairs of ear-like planar mounting tabs 42 and 43 are provided for mounting composite body 16 to a motor vehicle. Tabs 42 project from first body 12. Each of tabs 42 is positioned parallel to a corresponding tab 43 projecting from second body 14, thereby forming a pair. Referring to FIG. 3, a tubular mounting bar 45 extends between tab 42 and tab 43. Each tubular mounting bar 45 has a mounting aperture 47 extending therethrough, as illustrated in FIG. 2. It is important to note that snout-like projection 20 is intended to be angled downwardly. The installation instructions emphasize that fact and an arrow 23 is provided for the assistance of the user. The purpose of snout-like projection 20 is to permit any water splashed up into interior cavity 34 of composite body 16 to drain by force of gravity out of a drain passage 60 at terminus 24 of snout-like projection 20. Referring to FIG. 2, first body 12 includes a secondary dividing wall 44 immediately adjacent to snout-like projection 20. Second body 14 includes a similar secondary dividing wall 44 immediately adjacent to snout-like projection 20. Upon composite body 16 being formed, secondary dividing wall 44 of first body 12 and secondary dividing wall 44 of second body 14 form a water resistant secondary compartment 46. A circuit breaker 48 is disposed in secondary compartment 46 with a reset switch 50 projecting from secondary compartment 46 into interior cavity 34. Circuit breaker 48 is coupled to wiring 38 of a cord 52 positioned on spool 40 of retracting mechanism 36. An access opening 54 with a removable closure 55 is provided through snout-like projection 20. This provides access to reset switch 50 to manually reset circuit breaker 48. Cord 52 has attached to it a plug 56. An end 58 of plug 56 serves as a closure member. End 58 blocks opening 22 at terminus 24 of snout-like projection 20 when cord 52 is in a retracted position. End 58 also serves as a stop to prevent plug 56 from being retracted into interior cavity 34 of composite housing 16 when placed in the retracted position.

Figure 4:
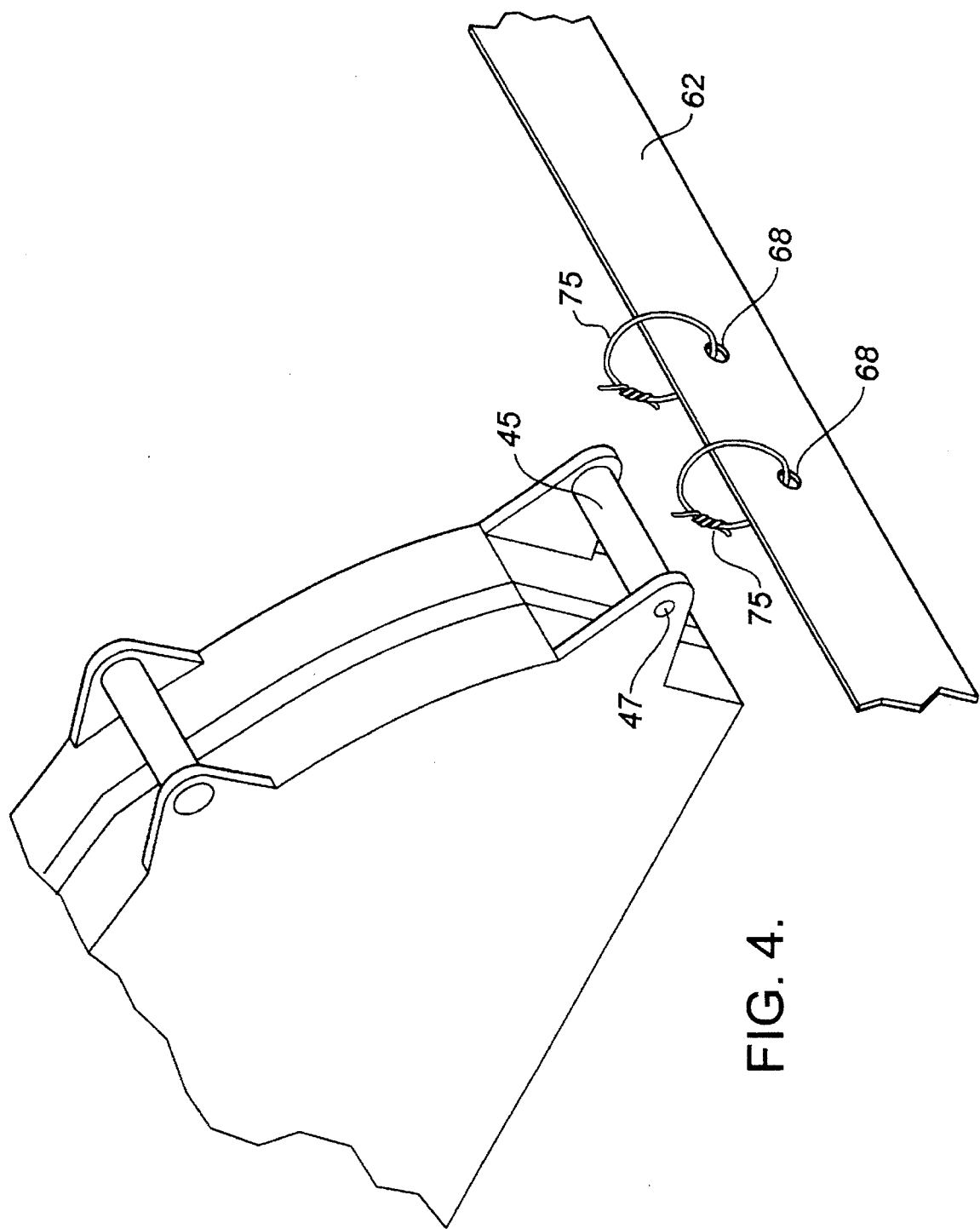
FIG. 4 is a perspective view of the housing illustrated in FIG. 1 in the process of being mounted to a truck bumper.
Figure 5:
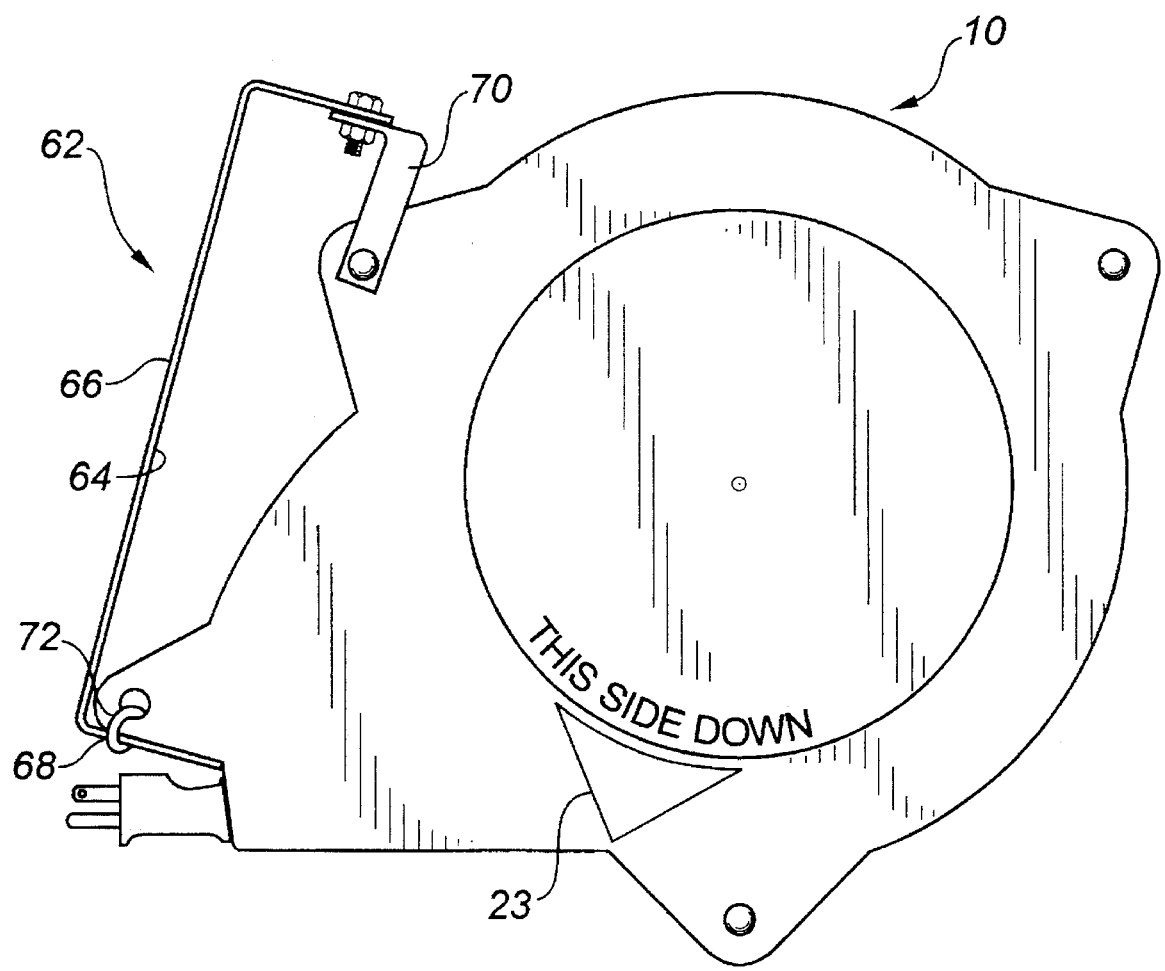
FIG. 5 is a side elevation view, partially in section, of the housing illustrated in FIG. 1 mounted to a truck bumper.

The use and operation of housing 10 will now be described with reference to FIGS. 1 through 5. Composite body 16 is mounted by means of mounting tabs 42 and 43. Apertures 47 allow side mounting where suitable. The preferred manner of mounting, however, is depicted in FIGS. 4 and 5. FIG. 5 illustrates a truck bumper 62 having an interior side 64 and an exterior side 66. Interior side 64 faces inwardly toward the undercarriage of the vehicle. Exterior side 66 faces outwardly and is visible to an observer. Truck bumper 62 has mounting apertures 68. Housing 10 can be attached to mounting apertures 68 by means of an attachment bracket 70 or a piece of tie 72. Whether attachment bracket 70 or piece of tie 72 are used, attachment to housing 10 is by way of mounting bars 45 and apertures 47. It is to be noted that housing 10 is mounted to truck bumper 62 with snout-like projection 20 angled downwardly and plug 56 accessible from below truck bumper 62. The male-female engagement provided by female coupling 28 and male coupling 30 makes housing 10 sufficiently water tight that it can withstand any drenching from above. Should water splash through opening 22 from below, such water drains by force of gravity back out of drain passage 60 due to the downwardly inclined angle of snout-like projection 20. In order to prevent water from splashing up through opening 22, end 58 of plug 56 blocks opening 22 when cord 52 is in a retracted position. Should a build up of heat occur, circuit breaker 48 will trip before any harm is done. Circuit breaker 48 may subsequently be manually reset by removing removable closure 55 and extending a finger or screw driver through access opening 54 in order to trip reset switch 50.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A retractable cord assembly mechanism, comprising:
   a first body;
   a second body;
   means for securing the first body to the second body in a water tight manner to create a composite body with an interior cavity, the composite body having a snout-like projection with an opening positioned at a terminus of the snout-like projection; and
   means for mounting the composite body with the snout-like projection angled downwardly such that any water splashed up into the interior cavity of the composite body drains by force of gravity out of the snout-like projection; and
   the composite body including a water resistant secondary compartment in which a circuit breaker is disposed, the circuit breaker being coupled to wiring of a cord positioned on a retracting mechanism.

2. The assembly as defined in claim 1, wherein the composite body has a mounting arrow indicating the correct mounting orientation.

3. The assembly as defined in claim 1, wherein a closure member is mounted on the cord, the closure member blocking the opening at the terminus of the snout-like projection when the cord is in a retracted position, the closure member serving as a stop to prevent the cord from being completely retracted into the interior cavity of the composite body when the cord is retracted.

4. The assembly as defined in claim 1, wherein the means for mounting the composite body includes a plurality of mounting tabs with mounting bare extending between the mounting tabs, one of the mounting bars being positioned on the snout-like projection.

5. A retractable cord assembly, comprising:
   a first shell form body having a form defining sidewall that includes a snout-like projection, a cord withdrawal opening extending through the sidewall at a terminus of the snout-like projection, the sidewall having a top peripheral edge;
   a second shell form body having a form defining sidewall that includes a snout-like projection, a cord withdrawal opening extending through the sidewall at a terminus of the snout-like projection, the sidewall having a top peripheral edge;
   means for securing the sidewall of the first body adjacent the top peripheral edge to the sidewall of the second body adjacent the top peripheral edge in a water tight manner, thereby mating the first body with the second body to create a composite body with an interior cavity in which a cord retracting mechanism and associated electrical wiring, and electrical connections are positioned, the composite body having a composite snout-like projection having a composite terminus with a composite cord withdrawal opening; and
   means for mounting the composite body with the composite snout-like projection angled downwardly such that any water splashed up into the composite body drains by force of gravity out of the composite snout-like projection; and
   the first body including a secondary dividing wall immediately adjacent to the snout-like projection, the second body including a secondary dividing wall immediately adjacent to the snout-like projection, means for coupling the secondary dividing wall of the first body with the secondary dividing wall of the second body to form a water resistant secondary compartment upon the composite body being formed, a circuit breaker being disposed in the secondary compartment with a reset switch projecting from the secondary compartment into the interior cavity, the circuit breaker being coupled to the associated electrical wiring of a cord positioned on the cord retracting mechanism, an access opening with a removable closure being provided through one of the snout-like projections thereby providing access to the reset switch to manually reset the circuit breaker.

6. The assembly as defined in claim 5, wherein the top peripheral edge of the sidewall of the first body abuts with the top peripheral edge of the sidewall of the second body, a female coupling being positioned in an exterior surface of the sidewall of one of the first body and the second body adjacent the top peripheral edge, and a male coupling being provided on a projecting flange on an interior surface of the sidewall of the other of the first body and the second body, the male coupling mating with the female coupling to provide a water resistant seal.

* * * * *